Figures 1, 3:
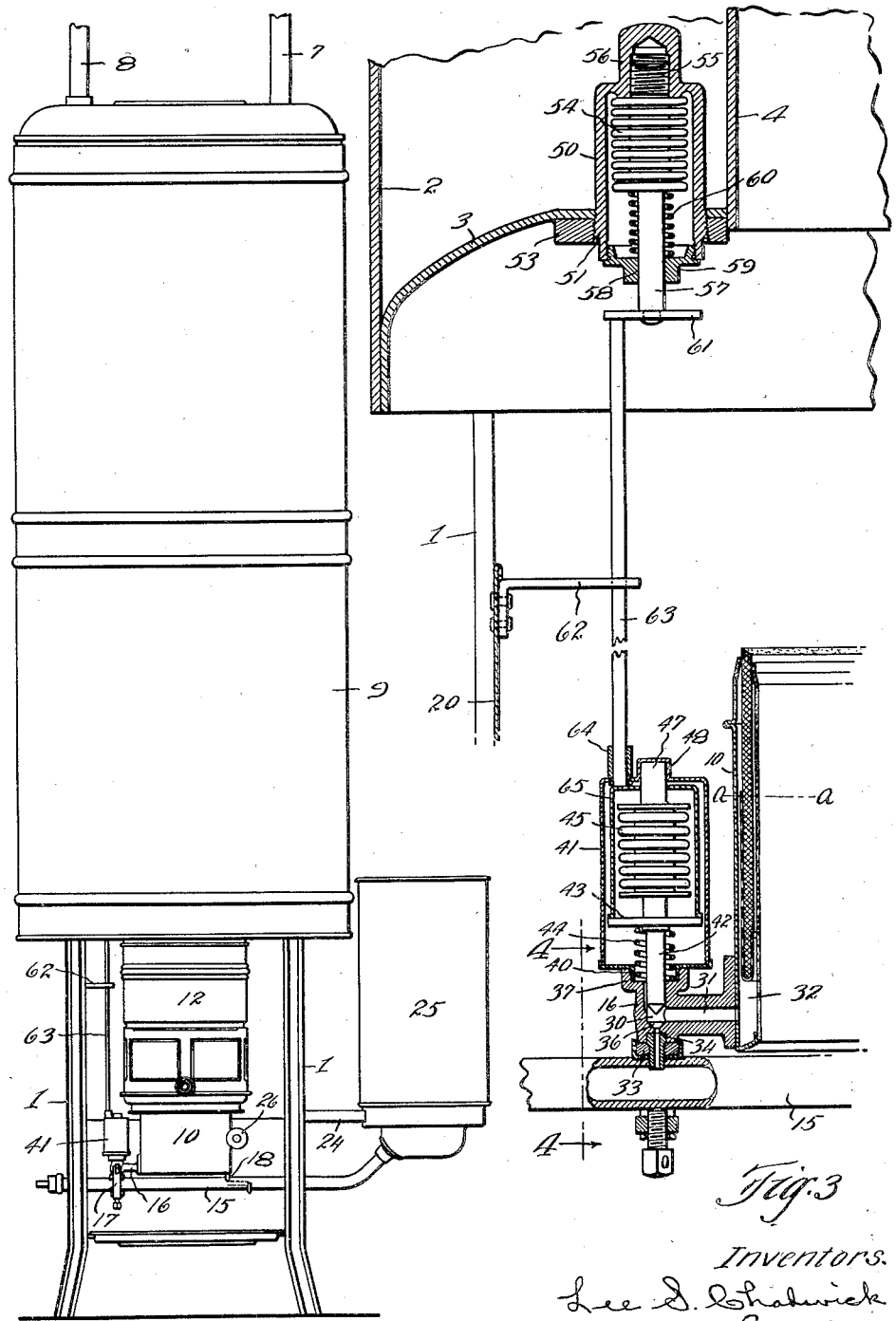

June 19, 1928.  
L. S. CHADWICK ET AL  
1,673,900  
THERMOSTATIC CONTROL FOR WATER HEATERS  
Filed Sept. 26, 1923    2 Sheets-Sheet 1

Inventors.
Lee S. Chadwick
Marc Rech
By Hull, Brock & West Attys.

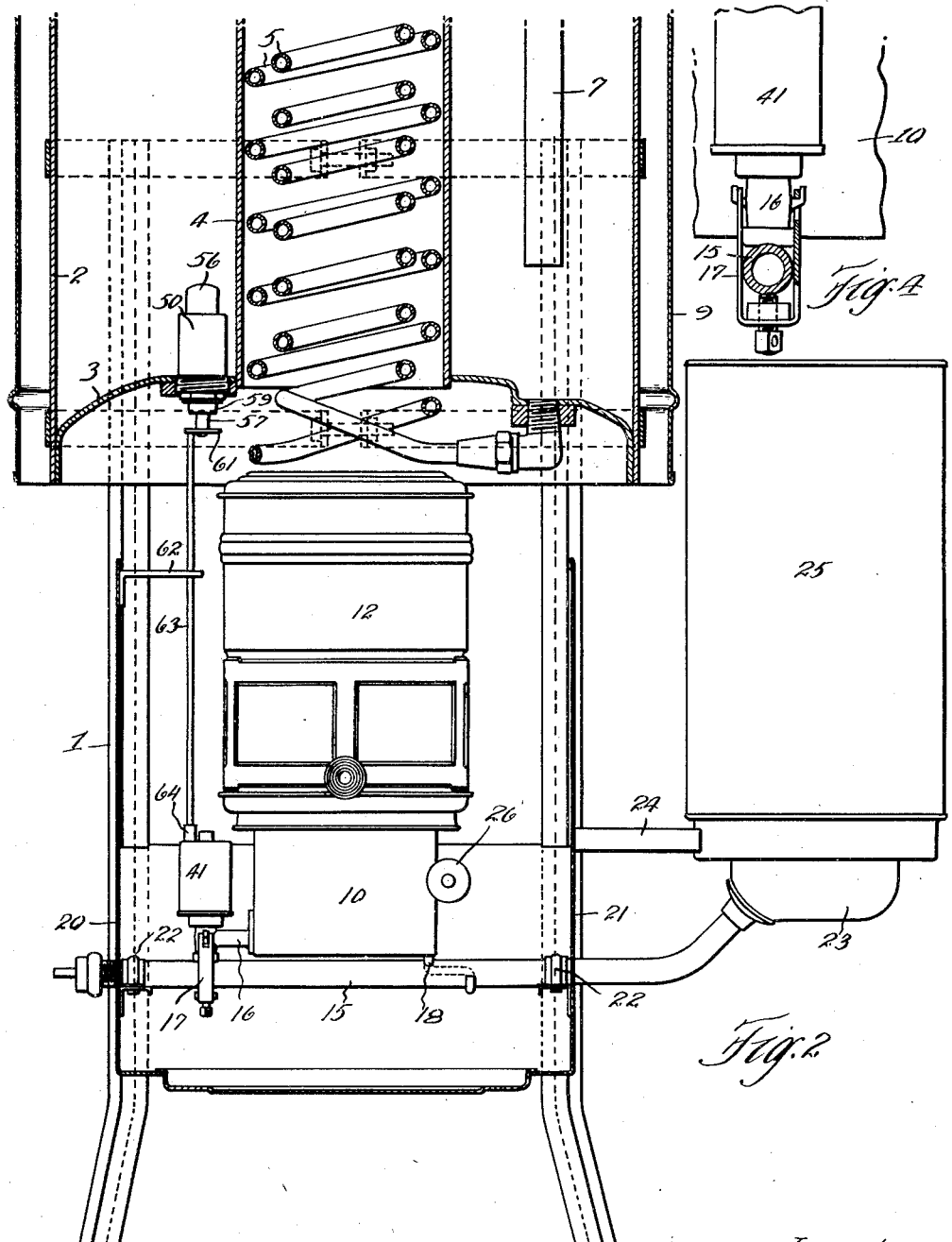

Patented June 19, 1928.

1,673,900

UNITED STATES PATENT OFFICE.

LEE S. CHADWICK, OF SHAKER HEIGHTS VILLAGE, AND MARC RESEK, OF EAST CLEVELAND, OHIO, ASSIGNORS TO PERFECTION STOVE COMPANY, OF CLEVELAND, OHIO, A CORPORATION OF OHIO.

THERMOSTATIC CONTROL FOR WATER HEATERS.

Application filed September 26, 1923. Serial No. 664,851.

This invention relates to a thermostatic control for heating devices used in connection with water heating apparatus, especially where such devices consist of liquid fuel burners.

The invention, in its preferred form, is characterized by the employment of two thermostats that are independent of each other and which are arranged to act one at a time or in unison, one under the influence of the temperature of the water and the other under the influence of the temperature of the heating device, to reduce the heat of said device which, in the case of a liquid fuel burner, may be accomplished by shutting off the supply of fuel to the burner when the temperature of the water, or the burner, or both, rises above a predetermined point.

We are aware of the fact that there is nothing broadly novel in the use of a thermostat that is actuated by the temperature of the water in water heating apparatus to diminish or shut off the supply of fuel to the burner, except as the same is limited to liquid fuel burners, and to an arrangement affording advantage peculiar to the employment of burners of that class. It is new, however, so far as we know, to use in water heating apparatus, as herein disclosed, either in combination with the foregoing or alone, a thermostat that is actuated by the temperature of the heating device itself to reduce its heat, as by diminishing or shutting off the fuel supply. Apart from the water heating apparatus, this is disclosed and claimed in an application filed on even date herewith by Lee S. Chadwick, one of the present applicants, and entitled "Thermostatic oil burners".

While, according to the present embodiment, the reducing of the heat is accomplished by controlling the supply of the heating medium or fuel to the heating device or burner, it may be explained that where an oil burner of the wick type, such as that shown in the drawings, is employed the same effect may be accomplished by lowering the wick by means of a thermostat. Specific instances of such an arrangement are to be found in applications filed concurrently herewith jointly by Lee S. Chadwick, Marc Resek and J. Alger Dahlstrom, and entitled "Thermostatic control for heating devices" and "Thermostatic control for oil burners", the respective applications bearing Serial Nos. 664,854 and 664,855.

Among the objects of the invention are to provide, in water heating apparatus, a thermostatic control which will be caused to act, through an overheated condition of the water or an overheated condition of the heating device, to reduce the heat of said device. More specifically, to provide, in apparatus of the aforesaid character wherein a liquid fuel burner is employed, thermostatic means which is caused to act, through an overheated condition of the water or burner, to reduce the size of the flame. Yet more limitedly, to provide, in water heating apparatus incorporating a liquid fuel burner, thermostats arranged to be actuated respectively by an overheated condition of the water and an overheated condition of the burner, and independently of each other, to reduce or shut off the supply of fuel to the burner.

Among further objects which shall appear as the description proceeds, are the provision of a simple and inexpensive, yet thoroughly reliable and durable construction that is convenient of assembling and is not likely to get out of order.

It is also an object of the invention to provide, in water heating apparatus involving a water container and a liquid fuel burner arranged directly below the same, together with a fuel supply communicating with the burner and means situated immediately adjacent the burner for controlling communication between the fuel supply and burner, a thermostat subjected to the temperature of the water in the container and acting through suitable connections to operate said means.

An embodiment serving well to illustrate the nature and mode of operation of our present invention is shown in the accompanying drawing where the invention is incorporated in water heating apparatus that constitutes the subject matter of an application filed concurrently herewith by the present applicants and entitled "Water heating and storage apparatus".

In the drawings, Fig. 1 is an elevational view of water heating apparatus incorporating our present improvements; Fig. 2 is an enlarged fragmentary sectional elevation through the lower portion of the apparatus; Fig. 3 is a further enlarged sectional view through a part of the water tank or container and the burner and through the respective thermostats associated therewith; and Fig. 4 is a sectional detail on the line 4—4 of Fig. 3.

Briefly, the apparatus wherewith we have shown our present invention associated comprises a stand 1 which supports a tank 2 having a bottom wall 3 and a central flue 4. Water circulating coils 5 are disposed in the flue 4 and at top and bottom have communicative connection with the storage compartment of the tank 2. The tank is equipped with the usual inlet and outlet pipes 7 and 8, respectively. A jacket 9 encloses the tank 2. A liquid fuel burner 10 is sustained by the stand 1 with its flue or chimney 12 substantially in axial alignment with the flue 4. Communicative connections are established between the burner 10 and a fuel supply pipe 15 through an elbow fitting 16 that is bound to the pipe by a suitable clamp 17. A very firm connection between the burner and the supply pipe is effected through the elbow fitting 16 and the clamp 17, and a clip 18, which is engaged about the supply pipe and is connected to the side of the burner opposite the fitting 16, assists in holding the burner in a proper fixed relation to the pipe. The supply pipe extends through apertures in the opposed side panels 20 and 21 of the stand and is secured to the said panels by members designated 22. Beyond the side panel 21 the supply pipe is connected to a distributing receptacle 23. The supply pipe and a brace 24 serve to support the receptacle in a very substantial manner so that a fuel reservoir 25 may be inverted thereover and sustained thereby. The burner includes the usual wick adjusting means which is indicated at 26.

For a more specific description of the foregoing parts, excepting the connection between the burner and supply pipe and the arrangement of the fuel supply pipe with respect to the burner, reference may be had to our copending application hereinbefore referred to.

The fitting 16 (Fig. 3) has a bore 30 which extends entirely through the vertical branch of the fitting, and a horizontal bore 31 that extends through the corresponding branch and through which communication is established between the vertical bore and the oil reservoir 32 of the burner 10. A seat 33 is secured to the pipe 15 by a nipple 34 which is reduced and threaded at its lower end and extended through an aperture in the seat and screwed into a tapped hole in the pipe, the nipple projecting a suitable distance above the seat into the bore 30 and having its upper end preferably countersunk to provide a valve seat 36. The lower end of the vertical branch of the elbow fitting 16 is firmly bound to the seat 33 by the previously mentioned clamp 17 so as to effect a liquid tight joint between the fitting and the seat.

Within a hollow enlargement 37 formed at the upper end of the vertical branch of the fitting 16 is engaged a neck 40 of a cylindrical liquid tight casing 41. A valve member 42, having a tapered lower end for engagement with the valve seat 36, is guided within the upper portion of the bore 30 and extends a material distance into the casing 41 where it has connected to it a disc 43. A spring 44 is interposed between the underside of said disc and an opposed abutment of the fitting 16, the same tending to lift the valve 44 from the seat 36. A thermostat 45, in the nature of a bellows of suitable metal and containing a fluid that is sensitive to slight changes in temperature, is engaged between the disc 43 and the top of the casing 41, the thermostat being shown as having a stud 47 which enters a hollow cylindrical boss 48 that rises from the top of the casing. It has been said above that the casing 41 is liquid tight. This quality is essential only below the oil level in the reservoir 32, and such level is indicated by the dotted line a—a in Fig. 3.

The thermostat 45 is in such close proximity to the burner 10 that the heat of the burner will actuate it, and the parts are so proportioned and positioned that when the temperature of the burner exceeds a predetermined point or, as may better express it, becomes excessively high, it will so expand the thermostat as to cause it to depress the valve 42 against the tension of the spring 44 and engage its lower end with the seat 36 thereby to shut off the flow of the fuel from the supply pipe to the reservoir of the burner. This will cause the flame to be diminished or, in time, extinguished unless the burner parts cool off rapidly enough to permit the thermostat to contract and lift the valve from its seat and replenish the supply in the reservoir 32 so that the flame may be revived before the supply in the reservoir is so depleted as to cause the flame to go out.

A housing 50 is projected upwardly through an aperture in the bottom wall 3 of the tank 2 and a threaded portion 51 thereof is screwed into a boss 53 that depends from said wall. A thermostat 54, similar to the previously described thermostat 45, is contained within the housing 50 and at its upper end has a threaded stud 55 which is screwed into the internally threaded boss 56 that rises from the housing 50. A stem 57 is secured to and depends from the thermostat and extends freely through an aperture 58 in a plug 59 that is screwed into the lower end of the housing 50. A spring 60 is shown as interposed between said plug and the lower end of the thermostat. A disk 61 is secured to the lower end of the stem 57 and extends over the upper end of a rod 63 which is supported adjacent its upper end by a guide 62 and has its lower end guided within a sleeve 64 which rises from the top wall of the casing 41, the rod extending through said sleeve and engaging the top of an inner casing 65 which encloses the thermostat 45 and has its lower end bearing upon the peripheral portion of the disc 43. The casing 65 has an aperture which accommodates the stud 47, and has no function other than that of providing a connection between the rod 63 and the disc 43.

It is clear from the foregoing that when the temperature of the water within the storage compartment of the tank 2 reaches a certain point it will cause the thermostat 54 to expand and depress rod 63, inner casing 65, disc 43 and valve 42 so as to engage the valve with the seat 36 and shut off the supply of fuel to the burner. It is equally clear that this action is entirely independent of the thermostat 45.

Thus it will be seen that our invention provides a thermostatic control for the heating device of a water heating apparatus which becomes effective to reduce the heat of the device when the water, or the heating device, or both become overheated. Especially in connection with oil burners it is highly essential to provide means for extinguishing the flame or reducing its size when the burner parts become overheated as otherwise such a condition might result in certain of the burner parts separating through a melting of the solder which holds them together and this, of course, would be disastrous; and the importance of providing means for automatically taking care of the situation in connection with water heating apparatus will be more fully appreciated when it is remembered that such an apparatus is usually situated in a basement of a house or building or in some other more or less out-of-the-way place and is given attention at very infrequent intervals.

An advantage arising from locating the liquid fuel burner directly below the water container is that very direct connections may be made between the thermostat situated within the bottom of the container and the valve which controls the flow of fuel to the burner and which, by necessity, must be located in immediate proximity to the burner as otherwise too much fuel would be left available to the demand of the flame and, as a consequence, the reduction in the size of the flame would be so slow as to defeat the purpose in view.

Having thus described our invention, what we claim is:

1. In apparatus of the character set forth, the combination of a water container, a liquid fuel burner in operative relation thereto, a thermostat so situated with respect to the container as to be actuated by the temperature of the water therein, a second thermostat so disposed to the burner as to be actuated by the temperature thereof, and connections through which said thermostats act to reduce the flame of the burner when the temperature of the water or the burner or both becomes excessively high.

2. In apparatus of the character set forth, the combination of a water container, a liquid fuel burner situated therebelow, a liquid fuel supply pipe, a tubular fitting through which communication is established between the burner and supply pipe, said fitting having a vertical bore and a valve seat disposed within said bore, a valve member guided within said bore for cooperation with said seat, a spring tending to lift said valve member from the seat, an abutment spaced from and fixed with respect to the valve seat, and a thermostat interposed between said abutment and the valve member.

3. In apparatus of the character set forth, the combination of a water container, a liquid fuel burner situated in operative relation thereto, a fuel supply, means establishing communication between the burner and fuel supply, a valve controlling such communication, and a thermostat subjected to the temperature of the burner parts and acting to positively move said valve toward closed position if and when the temperature of said burner parts reaches a predetermined maximum value.

4. In apparatus of the character set forth, the combination of a water container, a liquid fuel burner situated therebelow, a liquid fuel supply pipe, a tubular fitting through which communication is established between the burner and supply pipe, said fitting having a vertical bore and a valve seat disposed within said bore, a valve member guided within said bore for cooperation with said seat, a spring tending to lift said valve member from the seat, an abutment spaced from and fixed with respect to the valve seat, a thermostat interposed between said abutment and the valve member, said thermostat being so disposed to the burner as to be actuated by the temperature thereof, a second thermostat so situated with respect to the water container as to be actuated by the temperature of the water therein, and operative connections between the said mentioned thermostat and the valve member.

5. In apparatus of the character set forth, the combination of a water container, a liquid fuel burner situated below said container, a liquid fuel supply pipe, a tubular elbow fitting through which communicative connection is made between the burner and the pipe, said fitting having a vertical branch provided with a bore which forms a part of the aforesaid communicative connection, a valve seat disposed within said bore, a valve member guided within the bore and arranged for cooperation with said valve seat, a casing applied to the upper end of the vertical branch of said elbow fitting and into which the valve member projects, a disc applied to the upper end of the valve member, a spring tending to lift said disc and valve member, a thermostat disposed between said disc and the top of the casing, an element resting upon said disc and projecting above the thermostat, a rod extending through an aperture in the top of the casing and engaging said element, a thermostat subjected to the temperature of the water in the container, and operative connections between the second mentioned thermostat and said rod.

6. In apparatus of the character set forth, the combination of a water container, a heating device for heating the same, a thermostat so situated with respect to the container as to be actuated by the temperature of the water therein, a second thermostat so disposed to said heating device as to be actuated by the temperature thereof, and connections through which said thermostats act to reduce the heat of the said heating device when the temperatures affecting said thermostats reach predetermined maximum values.

7. In apparatus of the character set forth, the combination of a water container, a heating device for heating the same, a thermostat so situated with respect to the container as to be actuated by the temperature of the water therein, a second thermostat so disposed to said heating device as to be actuated by the temperature thereof, and connections through which said thermostats act independently of each other to reduce the heat of the said heating device when the temperatures affecting the respective thermostats reach predetermined maximum values.

8. In apparatus of the character set forth, the combination of a water container, a liquid fuel burner for firing the same, a fuel reservoir, communicative connections between said reservoir and the burner, a valve in said connections, a thermostat so situated with respect to the container as to be actuated by the temperature of the water therein, a second thermostat so disposed to said burner as to be actuated by the temperature thereof, and connections through which said thermostats act to move said valve toward closed position when the temperature affecting said thermostats reach predetermined maximum values.

In testimony whereof, we hereunto affix our signatures.

LEE S. CHADWICK.
MARC RESEK.